Aug. 11, 1931.  C. C. BENNETT  1,818,677

WHEEL GAUGE

Filed Aug. 6, 1928

INVENTOR
Claude C. Bennett
BY
Frank Warren
ATTORNEY

Patented Aug. 11, 1931

1,818,677

UNITED STATES PATENT OFFICE

CLAUDE C. BENNETT, OF SEATTLE, WASHINGTON, ASSIGNOR TO A. E. FERAGEN, INC., OF SEATTLE, WASHINGTON, A CORPORATION OF WASHINGTON

WHEEL GAUGE

Application filed August 6, 1928. Serial No. 297,686.

My invention relates to improvements in wheel and axle aligning gauges for use in connection with the front axles of motor vehicles and my present invention pertains to subject matter related to that of my prior Patent No. 1,653,249, issued December 20, 1927.

The object of my present invention is to provide a gauge that may be applied to a front wheel bearing spindle from which the wheel is removed to determine the inclination that a wheel will have when placed on said spindle. This inclination is usually called camber but by means of such inclination caster of the axle can be determined, in a manner common in the art.

Another object is to provide a wheel aligning gauge of this nature in which the angles are read directly from the gauge, thus tending to eliminate errors, saving time, and rendering the device simple and easy to use.

Further objects are to provide a wheel and axle aligning gauge of this nature that is simple in construction, not expensive to manufacture, reliable in operation, and readily adjustable to axles and spindles of various different shapes and dimensions.

Other and more specific objects will be apparent from the following description taken in connection with the accompanying drawings.

In the drawings, Figure 1 is a view in elevation showing my gauge applied to the bearing spindle of the front axle of a motor vehicle to determine the angle of said bearing spindle relative to the horizontal, thereby affording the information which is necessary to determine the camber which said bearing spindle will impart to a wheel that is operatively mounted on said spindle, or the caster of the axle upon which the spindle is supported.

50 Similar characters of reference are used to indicate corresponding parts throughout the various figures.

Figure 1:
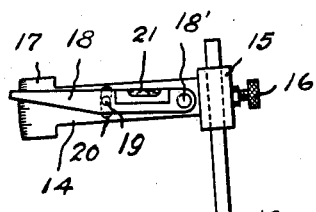
Figure 1:
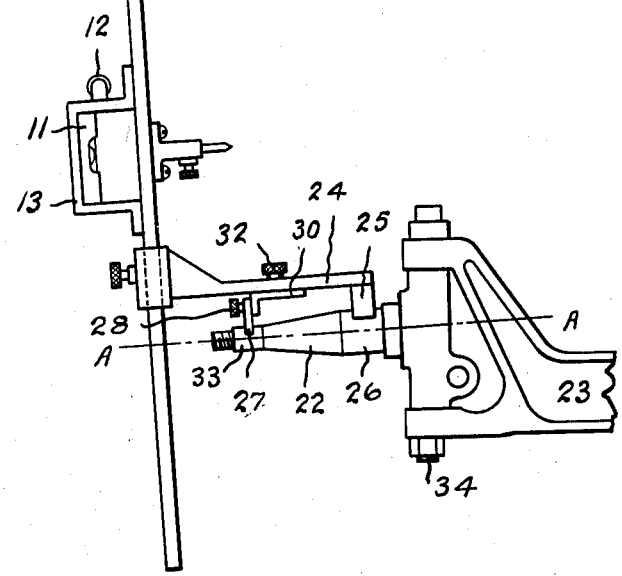
Figure 3:
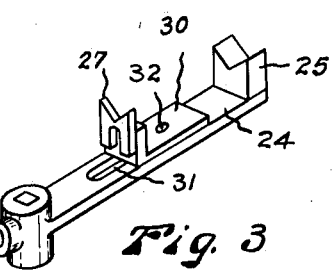
Fig. 3 is a detached inverted perspective view of a spindle engaging member forming a part of the invention.
Figure 2:
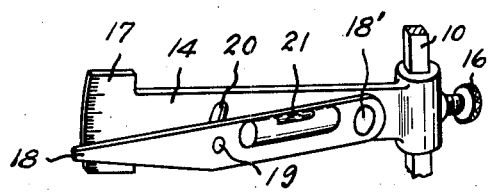
Fig. 2 is a detached perspective view of an angle gauge used in connection with the invention.

The front wheels of motor vehicles are ordinarily inclined or adjusted so that said front wheels are closer together at the bottom than at the top. This inclination of the wheels, when in the straight-ahead position, is ordinarily called the camber. The inclination of the axle back at the top is called its caster. The front wheels and the axle of motor vehicles are ordinarily adjusted at the factory so that they have the correct camber and caster but this adjustment may be disturbed, by wear, and by shocks and collisions, to such an extent that the vehicle may steer hard or the front tires may wear too rapidly, in which case it may be necessary to readjust either the camber of the wheels or the caster of the axle, or both. My gauge makes it possible to detect errors in the camber of the front wheels when this error is due to the faulty alignment of the bearing spindle on which the wheel is operatively mounted.

The invention consists in the novel construction, adaptation and combination of parts as will be more clearly hereinafter described and claimed.

Referring to the drawings, 10 designates a straight metal bar, preferably square in cross section, and provided substantially midway between its two ends with a bubble tube 11 which is arranged parallel with the bar, and with another bubble tube 12 which is arranged perpendicular, or at right angles to the bar, both of said bubble tubes being supported by a bracket 13. The bubble tube 11 makes it possible to use the bar 10 for ordinary leveling purposes, as for leveling up an axle (which, of course, is essential if the camber angle is to be measured relative to the horizontal), while the bubble tube 12 is used for plumbing the bar 10 as hereinafter described. All parts of the gauge except the bubble tubes 11 and 12 are preferably adjustable relative to the bar 10 and entirely removable from said bar as hereinafter described.

As a means for determining or reading directly the various angles that are to be measured I provide an angle gauge comprising a flat plate 14 having a socket 15 on one end adapted to fit slidably on the bar 10 and to be secured thereto by a thumb screw 16, the socket 15 being accurately machined so as to fit the bar closely and hold the plate 14 always at right angles to the bar 10. The outer end of the plate 14 is widened as at 17 to afford room for marking graduations thereon, said graduations preferably being spaced at the correct distance to indicate the camber of a wheel in inches, or in degrees. A lever arm 18 is connected by a pivot 18' with the plate 14 near the socket 15. A thumb screw 19 passes through a slot 20 in the plate 14 and is threaded into the level arm 18 so as to hold said level arm 18 immovable in any position into which it may be adjusted. A bubble tube 21 is secured to the level arm 18, preferably parallel with the top edge thereof, said top edge being the edge from which the graduations or the dial portion 17 are read. To determine the inclination of the bar 10, relative to the true vertical, in a plane common to the bar 10 and gauge plate 14, the level arm 18 is adjusted into a horizontal position as indicated by the bubble 21 and the inclination of the bar is read directly from the scale on the dial portion 17, it being assumed that the bar 10 is held in a fixed position while the measurement is being made. This reading gives the camber of the wheel in the units in which the scale at 17 reads.

To measure caster, the gauge is applied to the spindle in the manner already described, and the spindle is swung first rearwardly, and then forwardly an equal amount, and the scale reading in the last position subtracted from the reading in the first position, giving the caster directly, as is well understood in the art.

In my prior Patent No. 1,653,249 I have disclosed means for engaging a vehicle wheel directly to measure the camber of a wheel without removing the wheel. In this application I disclose means for engaging with a front bearing spindle from which the wheel is removed to determine whether or not the bearing spindle is out of line, while in my co-pending application Serial No. 296,269, filed July 30, 1928 I have disclosed means for engaging within the upright king pin holes in an axle from which the bearing spindle of the wheel has been removed to determine whether or not said spindle pin holes are out of alignment and whether or not the axle has the proper caster. Misalignment may be due to bending in the wheel, in the spindle body, or in the axle, and in order to correct it, it is necessary that each be gauged independently of the others.

If the front wheel itself is broken or is warped or sprung out of shape it will be desired to apply the gauge directly to the bearing spindle 22 of said front wheel to determine whether said spindle is also out of line.

This may be done by removing the vehicle wheel as shown in Fig. 1 carefully leveling the front axle 23 by the use of the bar 10 and bubble 11, and then placing on the bar 10, a gauge arm 24 having, at its end remote from the bar 10, a block 25 having a V-shaped notch arranged to rest on the cylindrical portion 26 of the spindle 22 on which the inner roller bearing is ordinarily placed. Another contact member 27, which may likewise have a V-shaped notch, is adjustable longitudinally of and towards and away from the arm 24, a thumb screw 28 holding it to an angle plate 30, the latter being longitudinally adjustable by means of a slot 31 and thumb screw 32, said last named contact member 27 being arranged to rest on the outer cylindrical bearing receiving portion 33 of the spindle 22.

The last named member 27 is adjusted, in a manner hereafter explained, so that the gauge arm 24 is exactly parallel to the axis A—A of the bearing spindle 22 when placed as shown in Fig. 1. This gives to the bar 10, when plumb in one vertical plane, as indicated by the bubble tube 12, the same inclination in a plane at right angles to the axis of the bearing spindle 22 as a wheel would have if placed on said bearing spindle, thus giving the camber of the wheel. This camber may be read directly from the dial 17 by adjusting the level arm 18 into exactly a horizontal and reading the amount indicated by said level arm on the dial.

This gauge is simple in construction, easy to use, and gives the readings directly, thus reducing to a minimum the possibilities of error.

The foregoing description and accompanying drawings clearly disclose a preferred embodiment of my invention but it will be understood that this disclosure is merely illustrative and that changes in the device may be made within the scope and spirit of the following claims.

What I claim is:

1. In a gauge of the class described, a bar, means on the bar for engaging with a wheel bearing spindle to support the bar upright in a plane parallel to the plane in which a wheel would be supported by said bearing spindle, and means held on said bar in the plane of the spindle for gauging the inclination of the spindle's axis relative to the vertical.

2. The apparatus described in claim 1, the means for engaging the spindle comprising an arm extending at right angles from the bar, two contact members upon the bar, one being V-shaped to engage with the spindle near one end thereof, and the other being disposed to engage the opposite end of the spindle, and means whereby the latter contact member may be adjusted both perpendicularly and longitudinally relative to the arm.

3. In a gauge of the class described, a bar, means on the bar for gauging the inclination of said bar relative to the vertical, in a plane common to the axis of a spindle to be gauged, and means supported always at right angles to the bar for engaging with a wheel bearing spindle to support the bar in a plane at right angles to the axis of the wheel bearing spindle.

4. In a gauge of the class described, a bar, means for plumbing the bar in one plane, an angle gauge on the bar for indicating the inclination of said bar relative to the vertical in a plane at right angles to the plane in which the bar is plumbed, and means on the bar for engaging with a wheel bearing spindle to maintain the bar in a plane at right angles to the axis of the wheel bearing spindle.

5. In a gauge of the class described, a bar, means for plumbing the bar in one plane, an angle gauge on the bar for indicating the inclination of the bar relative to the vertical in a plane at right angles to the plane in which the bar is plumbed, an arm extending outwardly from the bar at right angles thereto, and means, including an adjustable member on the arm, for engaging with a front wheel bearing spindle to support the arm in parallel relation to the axis of the bearing spindle.

6. The apparatus as described in claim 5, in which the spindle-engaging means comprises a block having a V-shaped notch provided on the outer end of the arm for engagement with the roller bearing support at the inner end of the bearing spindle, the adjustable spindle-engaging member comprising an angle plate movable lengthwise of the arm and a plate adjustably connected therewith for contacting with the roller bearing support at the outer end of the spindle.

7. In a gauge of the character described, a support adapted for engagement with a wheel bearing spindle to be thereby fixed in definite relation to the spindle's axis, and having an aperture at its end beyond the spindle, which aperture is at a definite angle to the spindle-engaging means, an upright member received in said aperture beyond the end of the spindle, in definite relationship to said support, and means on said upright member for indicating the inclination of the spindle's axis from the horizontal.

In testimony whereof I affix my signature.

CLAUDE C. BENNETT.